United States Patent [19]
Yamagishi

[11] Patent Number: 5,115,199
[45] Date of Patent: May 19, 1992

[54] FAULT DETECTING SYSTEM FOR DUPLEXING TYPE LOCAL AREA NETWORKS

[75] Inventor: Takashi Yamagishi, Fuchushi, Japan

[73] Assignee: Kabushiki Kaisha Toshiba, Kawasaki, Japan

[21] Appl. No.: 510,248

[22] Filed: Apr. 18, 1990

[30] Foreign Application Priority Data

Apr. 19, 1989 [JP] Japan ................................. 1-97485

[51] Int. Cl.$^5$ ............................................. G01R 31/11
[52] U.S. Cl. ................................. 324/533; 324/534; 324/535; 324/642; 370/17; 379/26
[58] Field of Search ............... 324/533, 534, 535, 532, 324/512, 642; 370/13, 17; 379/26, 25, 6

[56] References Cited

U.S. PATENT DOCUMENTS

| | | | |
|---|---|---|---|
| 2,315,450 | 3/1943 | Nyquist | 324/532 |
| 2,931,975 | 4/1960 | Bechtel | 324/535 |
| 3,462,681 | 8/1969 | Biskup | 324/535 |
| 4,500,834 | 2/1985 | Ko et al. | 324/534 |
| 4,970,466 | 11/1990 | Bolles et al. | 324/533 |

Primary Examiner—Kenneth A. Wieder
Attorney, Agent, or Firm—Foley & Lardner

[57] ABSTRACT

In a fault detecting system suitable for the carrier band type LAN regulated by IEEE, and employed in each of stations coupled with each other via LAN, there are provided: a signal trail detector for detecting a signal trail of a solicit-successor frame contained in a transmission signal thereby to produce a trail start-timing detection signal; a carrier detector for detecting a carrier signal component contained in a reflection signal of the signal trail, which has been reflected from a fault occurrence place on the local area network, within a response window frame, thereby to produce a reflection end-timing detection signal; a timer unit for measuring a time period after the trail start-timing signal is produced from the signal trail detector until the reflection end-timing detection signal is produced from the carrier detector; and, a processor for processing the time periods derived from the timer unit of the fault detecting systems employed in the first and second stations so as to calculate a distance from the fault occurrence place on LAN to each of the first and second stations.

5 Claims, 13 Drawing Sheets

FIG. 11
COUNTER & CTR READ PORT

FIG. 12

FRAME FORMAT OF SOLICIT SUCCESSOR

FIG.13

FAULT DETECTING SYSTEM FOR DUPLEXING TYPE LOCAL AREA NETWORKS

BACKGROUND OF THE INVENTION

1. Field of the Invention

The present invention generally relates to a fault detecting system capable of detecting an accurate position on a local area network (LAN), where a fault occurs. More specifically, the present invention is directed to such a fault detecting system adapted to the 802.4 carrier band system regulated by IEEE.

2. Description of the Related Art

Figure 1:
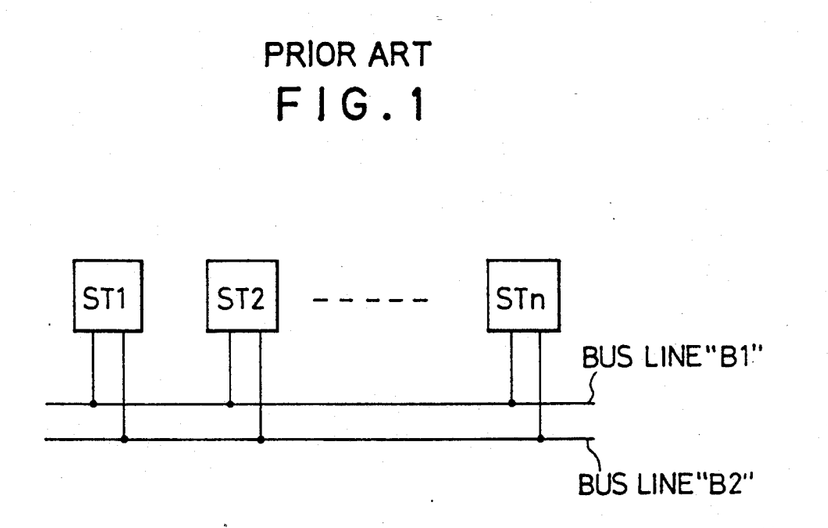
FIG. 1 is a schematic block diagram of the conventional duplexing type LAN system.

In FIG. 1, there is shown a typical signal transmission system known as a local area network (referred to as a "LAN").

In the signal transmission system, there are provided two data bus lines B1 and B2 for a duplexing data transmission purpose, and also a plurality of stations ST1, ST2, ---, STn ("n" being an integer) connected parallel to both the data bus lines B1 and B2.

Figure 2:
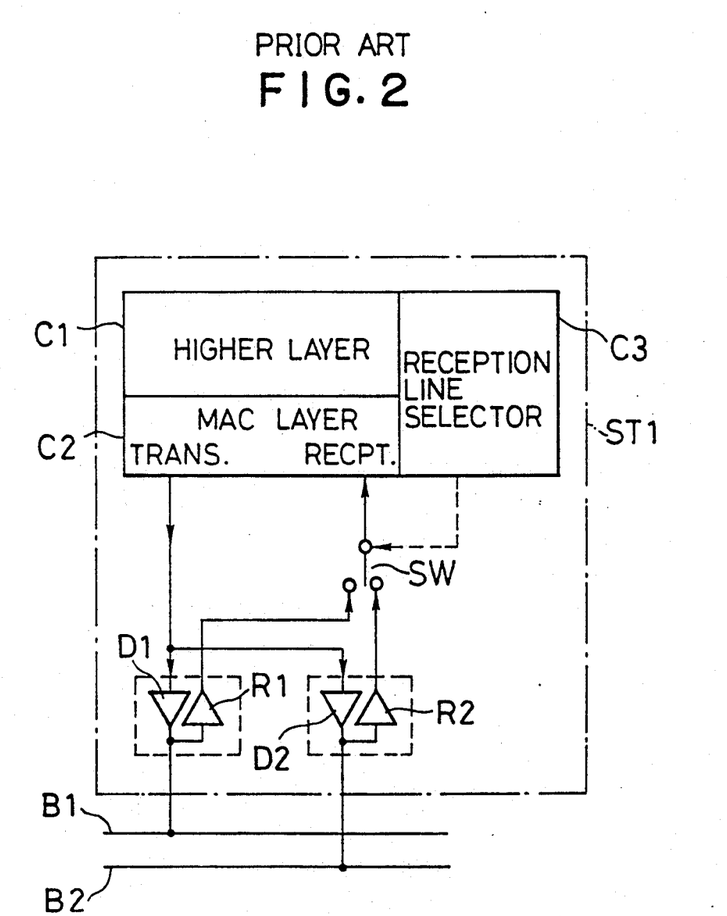
FIG. 2 is a schematic block diagram of an internal circuit of a first station employed in the conventional LAN system shown in FIG. 1.

FIG. 2 schematically illustrates an internal circuit arrangement of a first station ST1 employed in the conventional LAN shown in FIG. 1, which is similar to that of each station ST2, ---, STn.

The first station of LAN includes a higher layer "C1", a MAC layer "C2", a reception line selector "C3", a switch "SW", a combination of driver "D1" and receiver "R1" for the first bus line B1, and also another combination of driver "D2" and receiver "R2".

A transmission signal derived from the physical layer C1 employed in the first station ST1 is simultaneously transmitted via the drivers D1 and D2 to both the first and second bus lines B1 and B2. A reception signal which has been transmitted from other stations ST2, ---, STn and received via the receivers R1 and R2 from the first and second bus lines B1 and B2, is selected by way of the switch SW under the control of the reception line selector C3. Accordingly, only the signal transmitted from the normal bus line is selected and then inputted into the MAC layer C2.

In such a conventional duplexing type LAN system, when a fault, e.g., line disconnections and shortcircuits happen to occur in any one of these bus lines B1 and B2, a quick detection is required to search an accurate place where such a fault occurs.

In accordance with one conventional fault detecting apparatus, the pulse signal is transmitted from a specific position within the local area network, a time period between a transmission of the pulse signal and a reception of a reflected signal is measured so as to detect the place where the fault occurs.

Generally speaking, a signal strength of this reflected signal is very weak, because the pulse signal is reflected by the mismatching of the faulty bus line. Thus, the above-described conventional fault detecting apparatus can hardly detect such a reflected signal under such a condition that the normal transmission signal simultaneously appears on the faulty local area network. That is to say, the reflected signal is mixed with the normal transmission signal. As a result, to practically operate the conventional fault detecting apparatus, the fault detecting operation is performed either under such a condition that the operations of the overall stations ST1, ST2, ---, STn are stopped to interrupt system functions, or under such a state that LAN where the fault may occur is disconnected from all of the stations ST1, ST2, ---, STn even though the system still functions.

However, if the operations of the entire stations are stopped, the specific advantages achieved by the duplexing type LAN system are deteriorated. On the other hand, if only LAN where the fault may occur is disconnected from the overall stations, the above-described merits of the duplexing LAN system may be protected. Nevertheless, since most of stations are arranged in a discrete condition in the duplexing LAN system, there is another problem that a very long time is necessarily required to disconnect the faulty LAN.

The present invention has been made to solve the above-described problems of the conventional fault detecting apparatus, and therefore has an object to provide a fault detecting system capable of detecting an accurate place in a duplexing type LAN where a fault may occurs, under a condition that the overall system is still operable. In other words, the present invention has an aim to provide a fault detecting system suitable for the IEEE's carrier band type LAN system.

SUMMARY OF THE INVENTION

The above-described objects and other features of the present invention are achieved by providing a fault detecting system comprising:

signal trail detecting means (C5) for detecting a signal trail of a solicit-successor frame contained in a transmission signal thereby to produce a trail start-timing detection signal;

carrier detecting means (C6) for detecting a carrier signal component contained in a reflection signal of said signal trail, which has been reflected from a fault occurrence place on the local area network, within a response window frame, thereby to produce a reflection end-timing detection signal;

timer means (C7) for measuring a time period (t) after said trail start-timing signal is produced from said signal trail detecting means until said reflection end-timing detection signal is produced from said carrier detecting means; and, processing means (C4) for processing said time periods derived from said timer means (C7) of the fault detecting systems employed in said first and second stations (STn, STn-1) so as to calculate a distance (L) from said fault occurrence place on LAN to each of said first and second stations.

BRIEF DESCRIPTION OF THE DRAWINGS

For a better understanding of the present invention, reference is made to the following descriptions in conjunction with the accompanying drawings, in which.

DETAILED DESCRIPTION OF THE PREFERRED EMBODIMENTS

Arrangement of First Fault Detecting Apparatus

Figure 3:
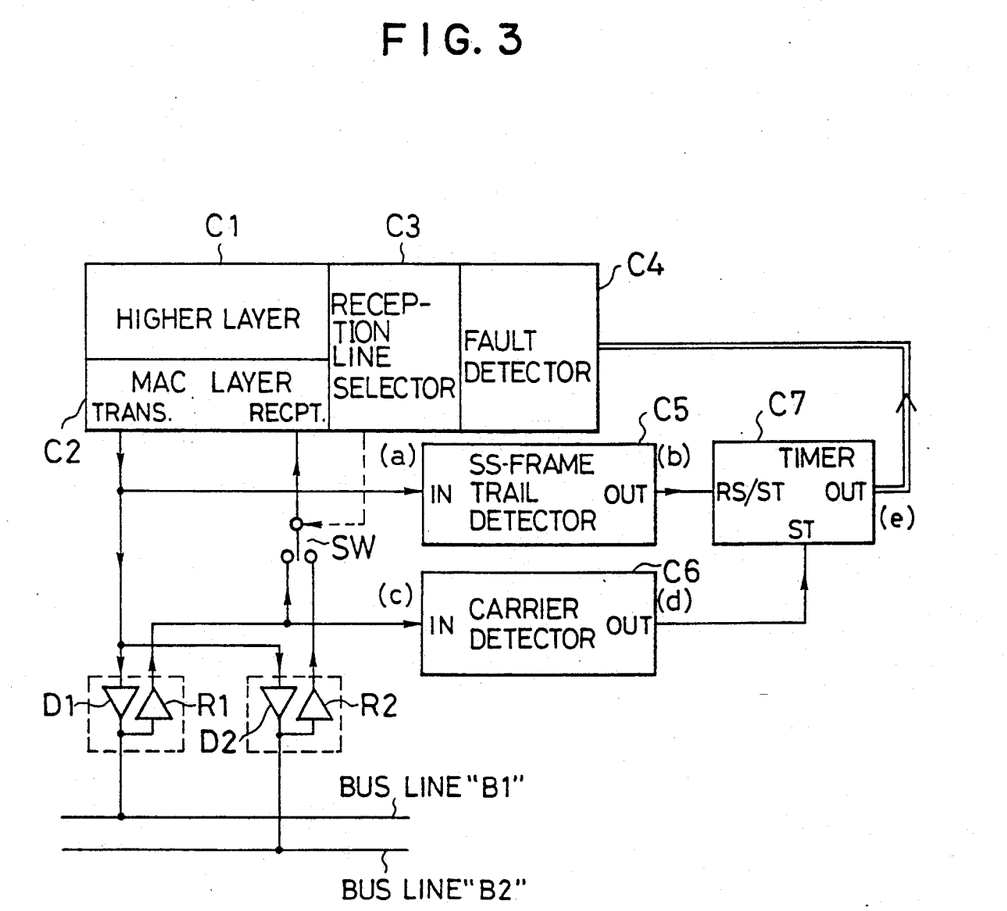
FIG. 3 is a schematic block diagram of an internal circuit of one station employing a fault detecting apparatus according to a first preferred embodiment of the present invention.

Referring now to FIG. 3, an arrangement of one station employing a fault detecting system according to a first preferred embodiment of the present invention will be described.

It should be noted that the same reference numerals shown in FIG. 2 will be employed as those for denoting the same or similar circuit elements in FIG. 3, and therefore no explanation thereof is made in the following description.

It should also be noted that this first fault detecting apparatus is designed to be operable for the 802.4 carrier band type LAN system regulated by IEEE.

In the fault detecting system shown in FIG. 3, a fault detector C4 detects an accurate position where a fault happens to occur in LAN by performing a predetermined calculation (will be discussed later) based upon time data acquired from a timer C7.

Further, a solicit-successor frame trail detector C5 is employed so as to detect the solicit-successor (SS) frame contained in the transmission signal of the MAC layer C2 and to output a pulse signal (shown in FIG. 5A) when a trail of this SS-frame is detected therein.

A carrier detector C6 is connected to two receivers R1 and R2 so as to detect whether or not a carrier is present in the reception signal. If yes, then "1"-level signal is outputted, whereas if no, then "0"-level signal is outputted.

A timer C7 is connected to the SS-frame trail detector C5 and carrier detector C6. When the "1"-level pulse signal is supplied from the SS-frame trail detector C5 to the timer C7, this timer C7 is reset. To the contrary, when the "0"-level pulse signal is furnished from the SS-frame trail detector C5, this timer C7 starts its counting operation. Furthermore, when the "0"-level signal derived from the carrier detector C6 is supplied to the timer C7, the above-described counting operation thereof is stopped. Time data is outputted from this timer C7 to the fault detector C4, whereby the fault detecting calculation is commenced.

First Fault Detection

Referring now to FIGS. 3 to 6, a fault detection by the fault detecting system according to the first preferred embodiments will be described.

Figure 4:
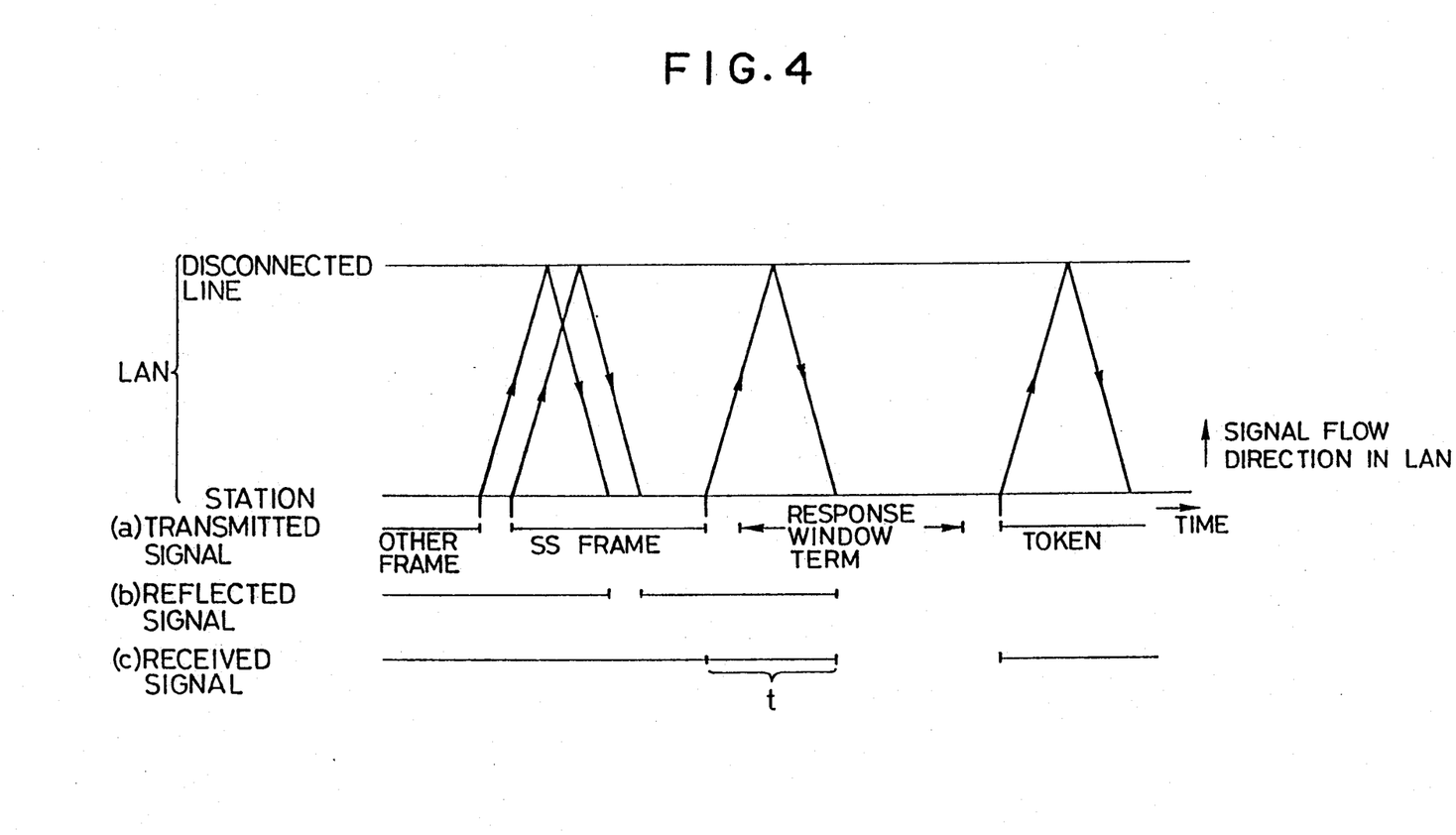
FIG. 4 is a timing chart for explaining various operations of the fault detecting system shown in FIG. 3.
Figures 5A, 5B:
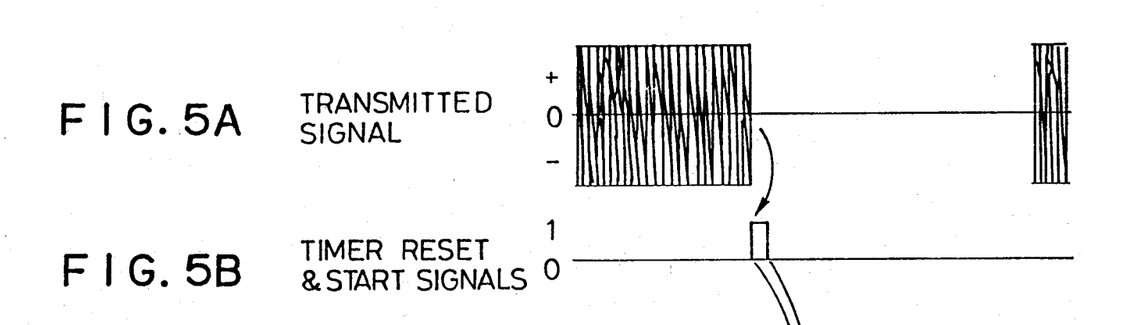
FIGS. 5A to 5E are signal waveforms of the fault detecting system shown in FIG. 3.
Figure 5C:
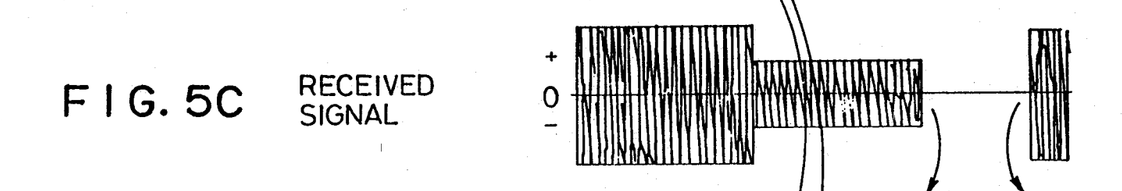
Figures 5D, 5E:
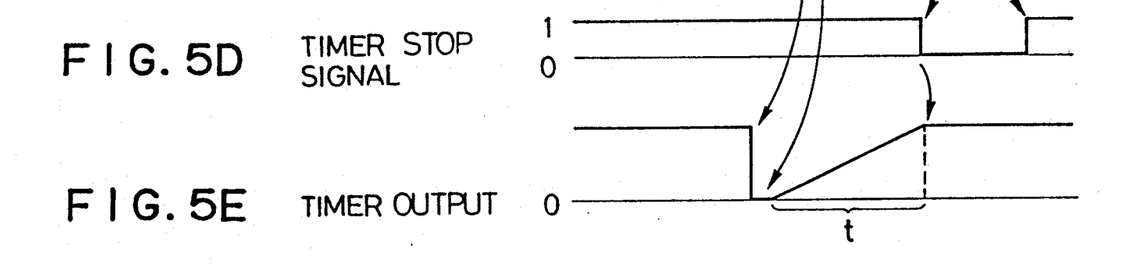
Figure 6:
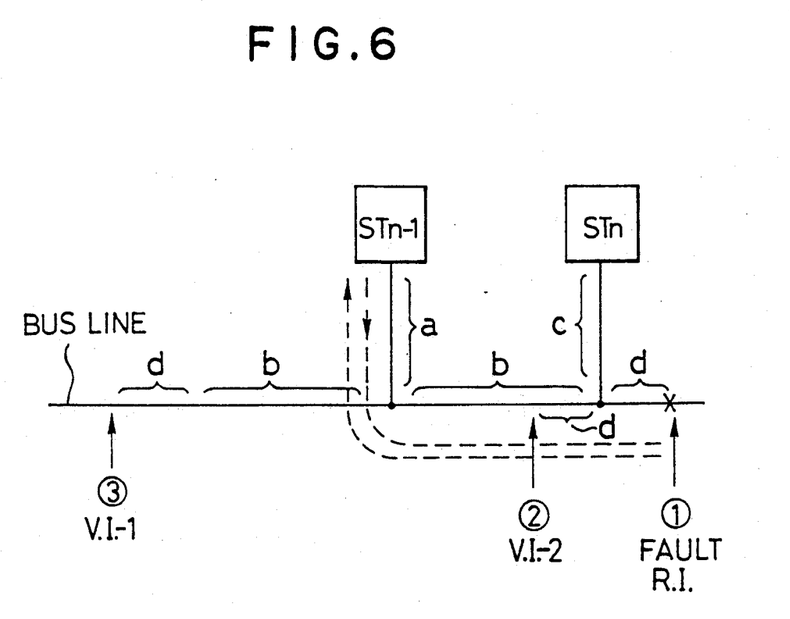
FIG. 6 is an illustration for explaining a fault detecting idea according to the fault detecting system shown in FIG. 3.

FIG. 4 is a timing chart for various signals appearing in this fault detecting system, FIG. 5 is a signal waveform thereof, and FIG. 6 is an illustration for explaining the fault detecting calculation.

As represented in FIG. 4(a), in such a 802.4 carrier band type LAN system regulated by IEEE, a response window term is provided just after the solicit-successor frame, taking account of newly entering a station into a logical ring. As a result, even when the stations are under operation in LAN system, no transmission signal appears during this response window term. Consequently, if there exists a certain signal in LAN, this signal is most probably equal to a signal reflected from a fault occurrence place in the local area network.

That is to say, when for instance, a portion of the local area network is disconnected, a reflected signal as shown in FIG. 4(b) are incomming with a predetermined delay time with respect the transmission signal (FIG. 4(a)). As a consequence, such a fault place occurring in LAN can be specified by detecting a time period "t" defined until the reflected signal of the trail of the solicit-successor frame is received by the SS-frame trail detector C5.

More specifically, when the trail of the solicit-successor frame appears in the transmission signal sent from the MAC layer C2, as represented in FIG. 4(a), the "1"-level pulse signal is derived from the SS-frame trail detector C5 (see FIG. 4(b)). In response to the rising edge of this pulse signal, the timer C7 is reset as represented in FIG. 5E.

Subsequently, when the "1"-level pulse signal derived from the SS-frame trail detector C5 disappears, i.e., the "0"-level pulse signal appears, the timer C7 starts the counting operation thereof as represented in FIG. 5E.

Then, when the reflected signal of the trail of the solicit-successor frame disappears as shown in FIG. 5C, a timer stop signal as indicated in FIG. 5D is produced so that the counting operation of the timer C7 is accomplished as represented in FIG. 5E.

At this time, the time data obtained by the timer C7 corresponds to an incoming time "t" of the reflected signal shown in FIG. 4(c).

Fault Occurrence Plate Determining Calculation

Referring now to FIG. 6, a calculation for determining a fault occurrence place in a local area network will be described.

Assuming now that a fault, e.g., a disconnection of a signal line happens to occur at a point denoted by "1" on LAN, one time period required for a reflected signal of a trail of a solicit-successor frame which has been transmitted from one station "STn-1" to this fault point 1 and returned from this fault point 1 to this station "STn-1", is given by the following formula (1):

$$(a+b+d) \times k \times 2 \qquad (1),$$

where "k" represents a propagation time of the signal on the signal line. As a result, the station STn-1 can determine both a real image point "R.I." and a first virtual image point "V.I-1" as the fault occurrence place by measuring the above-described time period.

Similarly, another time period for a reflected trail signal of a solicit-successor frame with respect to another station "STn" is given by the following formula (2):

$$(c+d) \times k \times 2 \qquad (2)$$

In this case, this station "STn" can specify the real image point "R.I." and a second virtual image point "V.I-2".

Subsequently, the first time data obtained from the first station "STn-1" and the second time data acquired from the second station "STn" are processed so as to finally determine the actual fault occurrence place 1, i.e., the real image point "R.I.". In other words, the place "1" on LAN, where the fault happens to occur, can be accurately defined by performing the calculations on the time data obtained from two physically separated stations.

Actual System Arrangement

Figure 7:
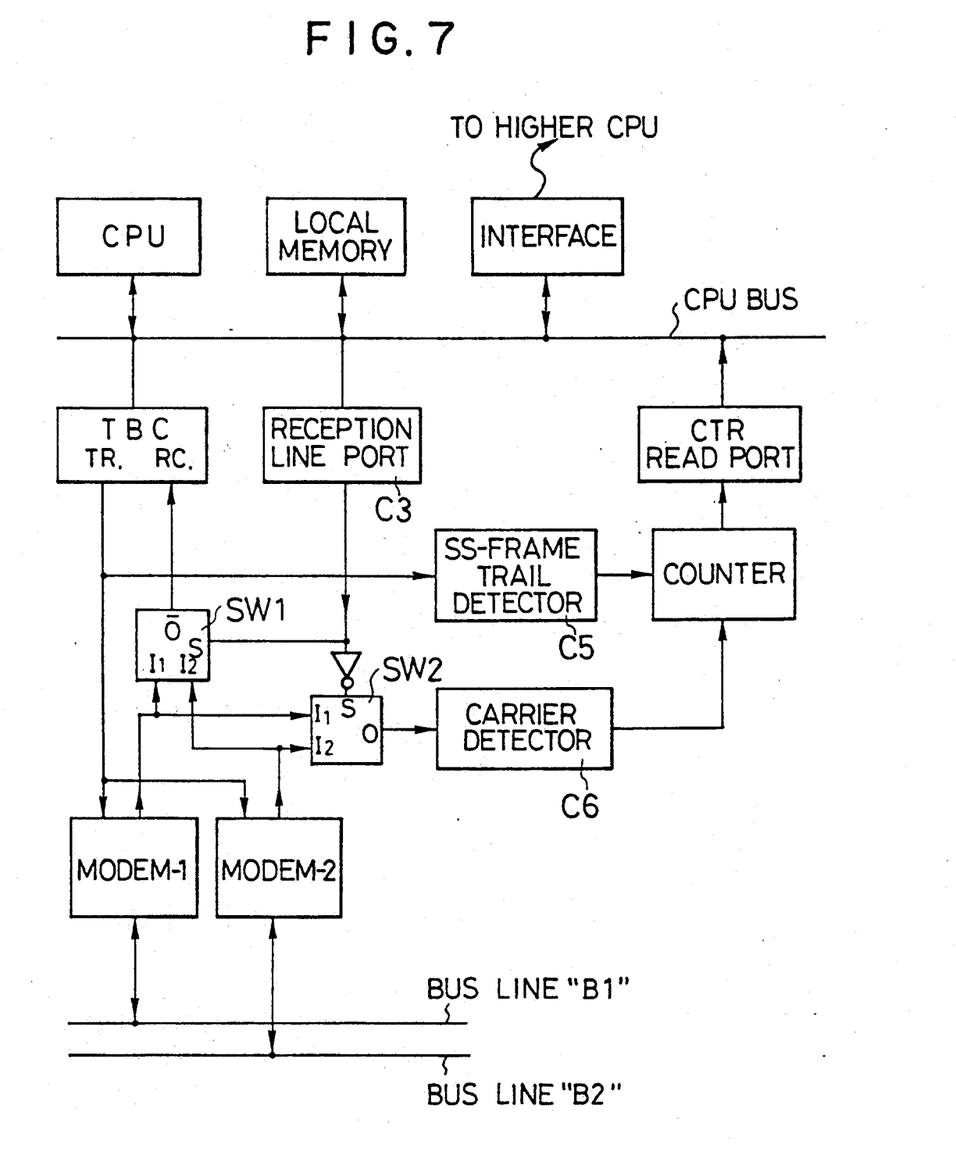
FIG. 7 is a schematic block diagram of a detailed internal circuit of the station shown in FIG. 3.

In FIG. 7, there is shown an internal circuit arrangement of an actual fault detecting system. That is, the block diagram of the first fault detecting system shown in FIG. 3 may be realized by employing the circuit arrangement of the actual fault detecting system shown in FIG. 7.

In the circuit arrangement shown in FIG. 7, a block "TBC" functions as the MAC layer C2 of FIG. 3, and is constructed of MOTOROLA's IC model MC68824. Two modems "MODEM-1" and "MODEM-2" convert a TTL-level signal into an RF signal for the transmission bus, and also the RF signal into the TTL-level signal, and are constructed of MOTOROLA's IC model MC68194. In a CPU bus, an address bus, a data bus and a control signal are contained. Since other circuit elements per se are known in this field, no further explanation is made.

Figure 8:
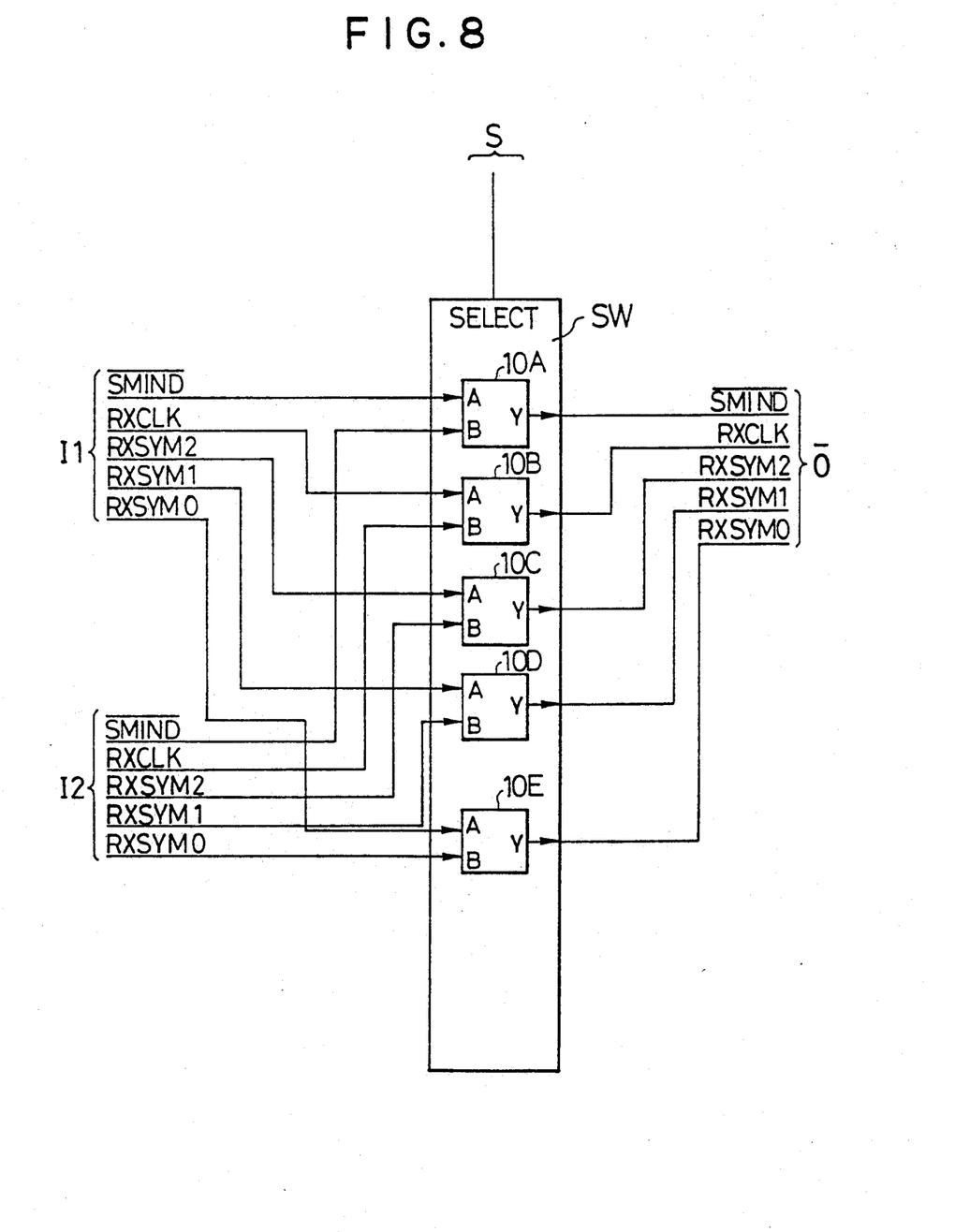
FIG. 8 is a circuit diagram of the signal selector SW employed in FIG. 7.

FIG. 8 is a circuit diagram of the switch SW. Although two switches are represented in the entire circuit diagram of FIG. 7, the arrangement of each switch SW is identical to each other, and accordingly only one arrangement thereof will be explained. As apparent from FIG. 8, one switch SW is constructed of five 2-channel multiplexers 10A to 10E. Thus, the reception signal is arranged by 5 signal lines I.1 or I.2.

Figure 9:
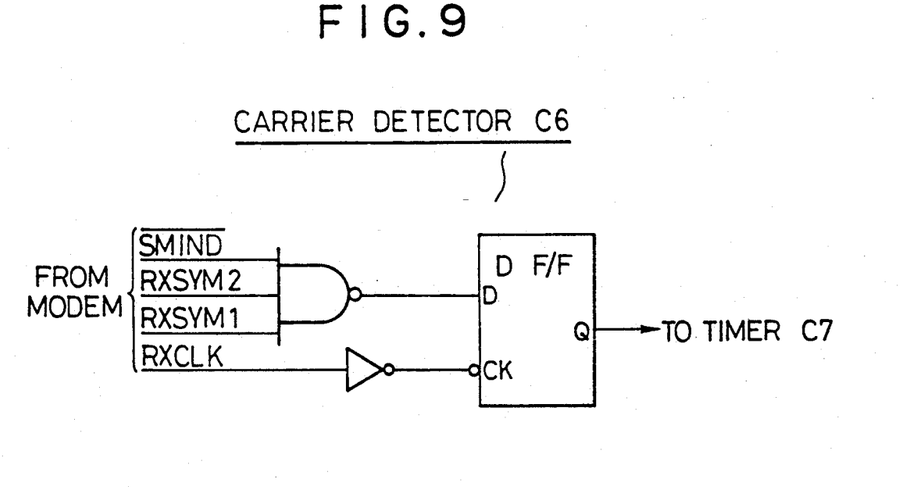
FIG. 9 is a circuit diagram of the carrier detector C6 employed in FIG. 7.

FIG. 9 represents a circuit arrangement of the carrier detector C6. When the carrier is contained in reception signals SMIND, RXSYM2, and RXSYM1 supplied from MODEM-1 and MODEM-2 via the switch SW2, a D flip-flop outputs "1"-level signal from a Q terminal thereof.

Figure 10:
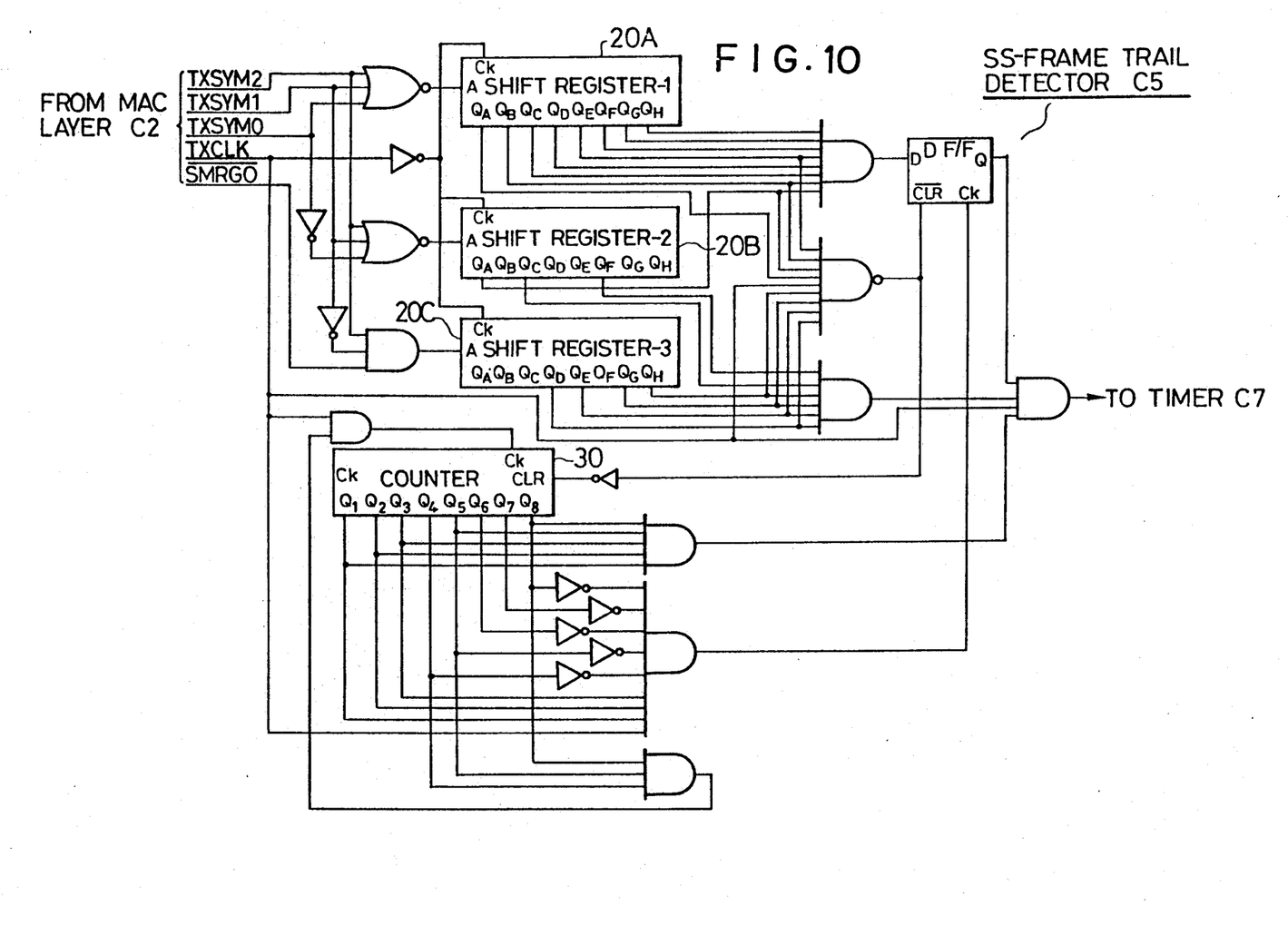
FIG. 10 is a circuit diagram of the SS-frame trail detector C5 employed in FIG. 7.

In FIG. 10, there is shown a circuit arrangement of the SS-frame trail detector C5. This SS-frame trail detector C5 is mainly constructed of three 8-bit shift registers 20A to 20C; an 8-stage binary counter 30 and other gate circuits.

Figure 11:
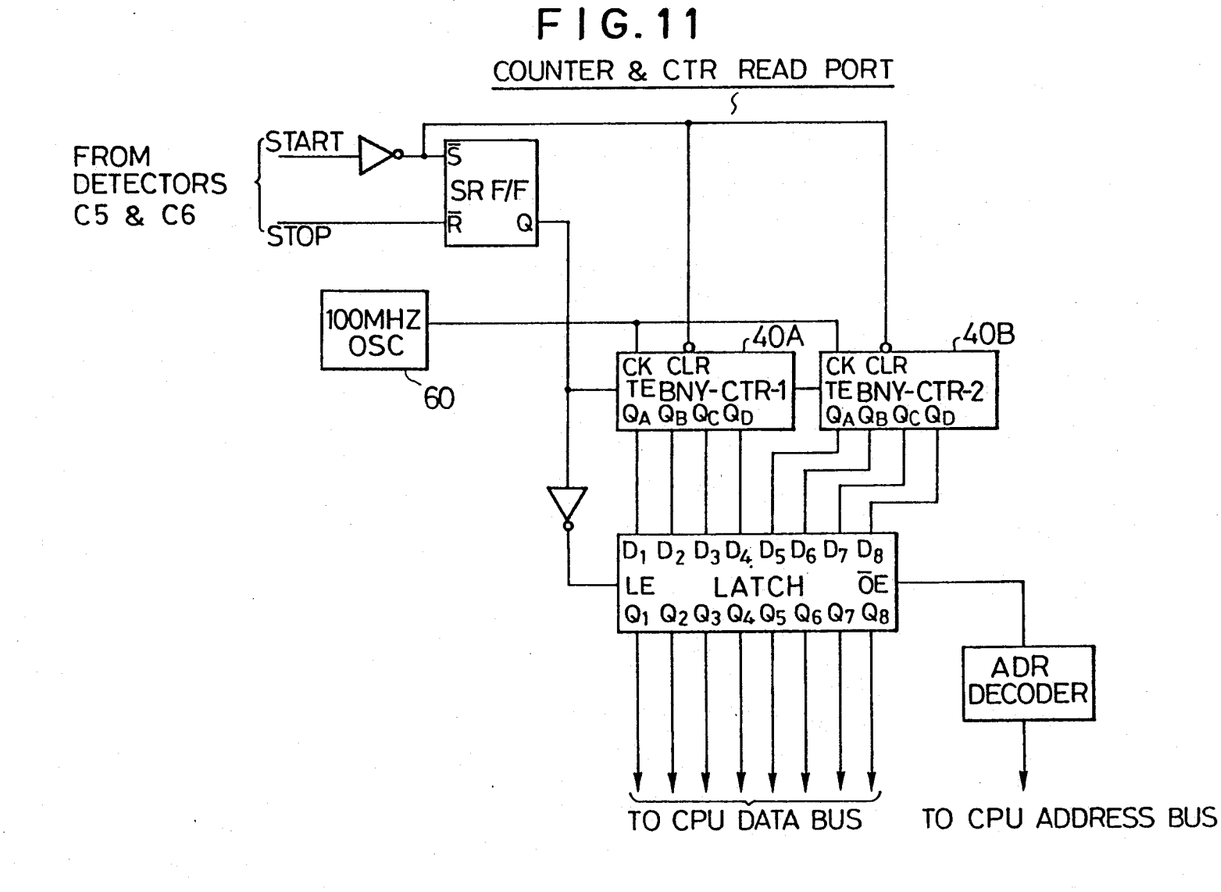
FIG. 11 is a circuit diagram of the counter and counter read port employed in FIG. 7.

Furthermore, FIG. 11 is a circuit arrangement of the counter and counter read port which constitute the timer C7 shown in FIG. 3. This circuit arrangement is mainly constructed of two sets of synchronous binary counters 40A and 40B; a 3-stage latch 50; and a reference oscillator having a clock frequency of 100 MHz.

Figure 12:
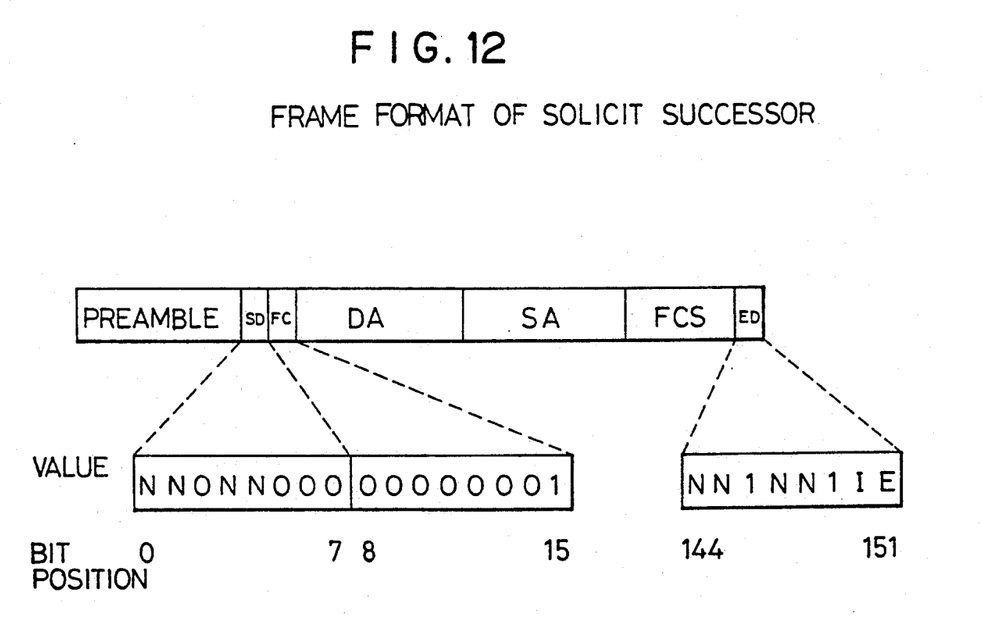
FIG. 12 illustrates a frame arrangement of the solicit successor used in LAN system; and, FIG. 13 is a flowchart for explaining a fault detecting operation performed by the fault detecting system shown in FIG. 3.

A frame format of the above-described solicit-successor is represented in FIG. 12. In accordance with the preferred embodiment, the solicit-successor frame is detected only based upon SD (start delimiter), FC (frame control, and ED (end delimiter).

Fault Determining Flow

Figure 13:
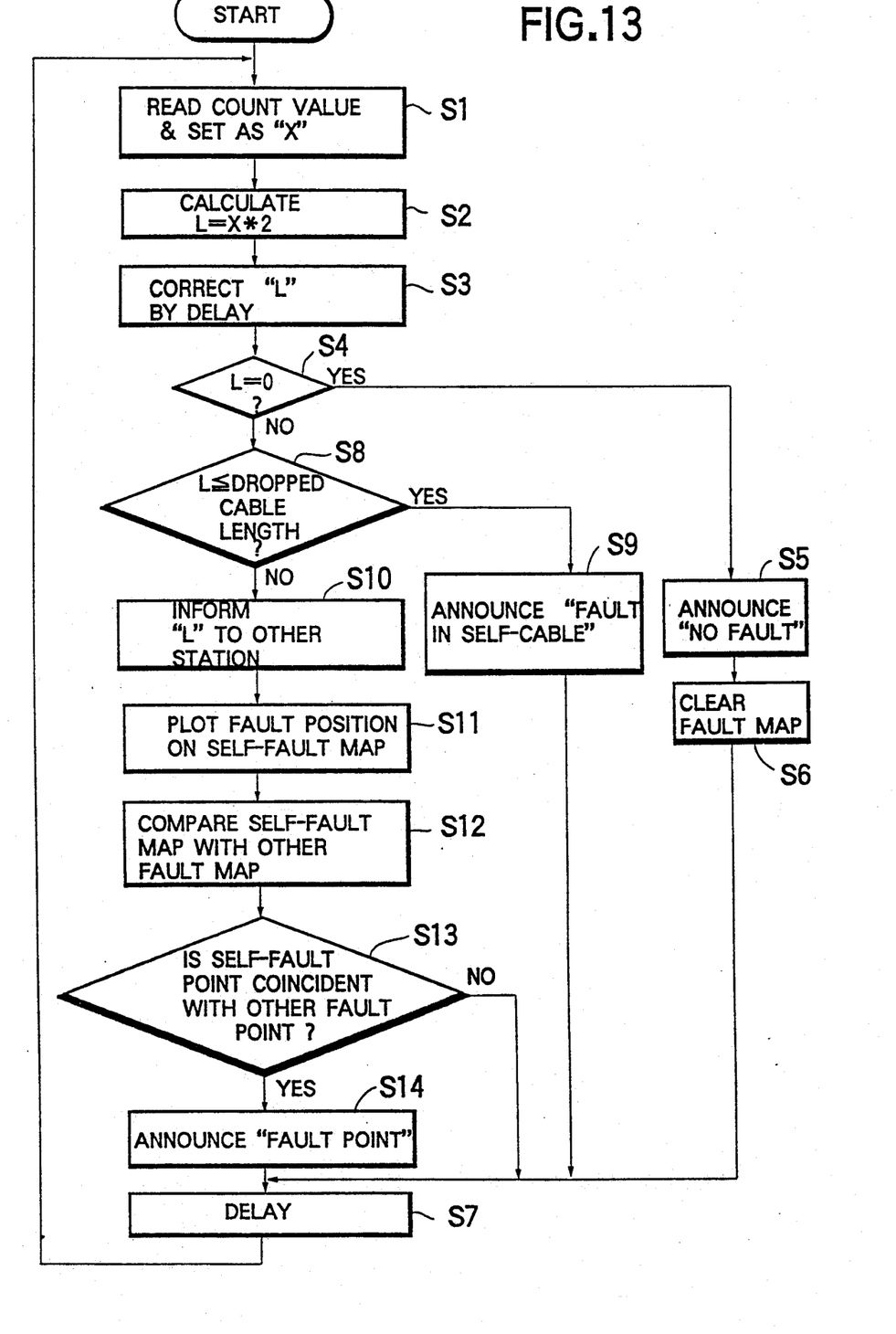

FIG. 13 is a flowchart for explaining how to determine a place on LAN where a fault, e.g., a shortcircuit happens to occur, in accordance with the fault detecting system of the preferred embodiment.

At a step S1 of this flowchart shown in FIG. 13, a count value of the binary counters 40A and 40B is read out and then set as "x". At a next step S2, the following calculation is carried out:

$$L = x*2 \tag{3}$$

where "L" indicates a distance between a fault occurrence place and a station in which the above equation (3) is calculated "x" represents a count value. A typical signal transmission velocity on a coaxial cable is known as 5 microseconds/km. Since the oscillating frequency of the oscillator 60 shown in FIG. 11 is selected to be 100 MHz, 1 count value corresponds to 2 m.

At a step S3, a delay correction is made to the calculated distance "L", which is caused by modems employed in the station. Then, a check is made whether or not "L=0" at a step S4. If yes, then the process is advanced to a step S5 in which an announcement "THERE IS NO FAULT IN LAN" is made. Thereafter, a fault map is cleared at a next step S6. Then, the process is returned via a delay step S7 to the first step S1.

Conversely, if No is judged at the previous step S4, then the process is advanced to a step S8. Another check is made whether or not the distance "L" is shorter than a length of a dropped cable for the self-station. If Yes, then the process is advanced to a step S9 in which an announcement "FAULT OCCURS ON DROPPED CABLE OF SELF-STATION" is made.

To the contrary, if No is judged at this step S8, then the distance "L" is informed to other station at a next step S10. At a subsequent step S11, a position corresponding to this distance "L" is plotted on a fault map for the self-station. At a step S12, a comparison is made between the fault map (i.e., fault occurrence point) for the self-station and another fault map for the relevant station to which the above-described distance "L" has been informed at the previous step S11.

Next, a judgement is made whether or not the fault point plotted on the self-fault map is coincident with the fault point plotted on the other fault map at a step S13. If No, then the process is returned via the delay step S7 to the first step S1. If Yes, then the process is advanced to a next step S14 where an announcement "FAULT OCCURRENCE POINT" is made. Subsequently, the process is returned via the delay step S7 to the first step S1.

As previously described in detail, in accordance with the fault detecting system of the first preferred embodiment, there is a particular advantage that the fault occurrence point on LAN can be determined in an on-line mode even under the operation of the overall system in such a manner that all of the stations need not be interrupted during the fault detecting work, but also only the faulty bus line is not necessary to be disconnected from the respective stations.

As apparent from the foregoings, the present invention is not limited to the above-described preferred embodiment, but may be modified without departing from the technical scope of the present invention.

For instance, such a function that when the time data obtained from the timer C7 are coincident with each other several times, this time data is used as truth data, may be additionally provided with the fault detector C4. This additional function is suitable for such a case that there exists a station for outputting a set successor in response to the solicit-successor frame.

As previously stated, in the fault detecting system according to the present invention, a place on a local area network on which a fault, e.g., a shortcircuit happens to occur can be immediately detected while operating the respective stations coupled to LAN without interrupting the operations of all of these stations and also without disconnecting the faulty LAN from the living LAN, whereby the duplexing LAN function can be still maintained with realizing the above-described features of the fault detecting system according to the present invention.

What is claimed is:

1. A fault detecting system employed in at least first and second stations coupled to each other via a carrier band type LAN (local area network), said fault detecting system comprising:

signal trail detecting means for detecting a signal trail of a solicit-successor frame contained in a transmission signal to produce a trail start-timing detection signal;

carrier detecting means for detecting a carrier signal component contained in a reflection signal of said signal trail, which has been reflected from a fault occurrence location on said local area network, within a response window frame, to reduce a reflection end-timing detection signal;

timer means for measuring a time period after said trail start-timing signal is produced from said signal trail detecting means until said reflection end-timing detection signal is produced from said carrier detecting means; and, processing means for processing time periods derived from said timer means of fault detecting systems employed in said first and second stations to calculate a distance from said fault occurrence location on said LAN to each of said first and second stations.

2. A fault detecting system as claimed in claim 1, wherein said signal trail detecting means includes three 8-bit shift registers and an 8-stage binary counter to detect at least both a start delimiter and an end delimiter contained in a transmission signal.

3. A fault detecting system as claimed in claim 1, wherein said carrier detecting means includes an inverter, a NAND gate, and a D flip-flop.

4. A fault detecting system as claimed in claim 1, wherein said timer means includes a pair of synchronous binary counters, a 3-stage latch circuit, and an oscillator having a 100 MHz clock.

5. A fault detecting system as claimed in claim 4, wherein said distance from said fault occurrence location on said LAN to each of said first and second stations is calculated as follows:

$$L = x*2 \text{ (km/count value)}$$

where
"L" is said distance,
"x" represents a count value of said binary counter, and 2 (km/count value) is defined by said 100 MHz oscillator.

* * * * *